United States Patent
Matos

(10) Patent No.: US 11,876,918 B2
(45) Date of Patent: *Jan. 16, 2024

(54) MOBILE TELEPHONE CASE FACILITATING WIRELESS CHARGING

(71) Applicant: Peter Anthony Matos, Miami Beach, FL (US)

(72) Inventor: Peter Anthony Matos, Miami Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/112,391

(22) Filed: Feb. 21, 2023

(65) Prior Publication Data
US 2023/0208951 A1    Jun. 29, 2023

Related U.S. Application Data

(63) Continuation of application No. 17/467,687, filed on Sep. 7, 2021, now Pat. No. 11,588,928, which is a continuation of application No. 17/009,391, filed on Sep. 1, 2020, now Pat. No. 11,115,513, which is a continuation-in-part of application No. 16/272,379, filed on Feb. 11, 2019, now Pat. No. 10,763,688.

(60) Provisional application No. 62/628,605, filed on Feb. 9, 2018.

(51) Int. Cl.
| | | |
|---|---|---|
| *H04M 1/00* | (2006.01) | |
| *H04M 1/02* | (2006.01) | |
| *H04M 1/21* | (2006.01) | |
| *H02J 7/02* | (2016.01) | |

(52) U.S. Cl.
CPC ............ *H04M 1/0262* (2013.01); *H02J 7/02* (2013.01); *H04M 1/21* (2013.01)

(58) Field of Classification Search
CPC .......... H02J 7/025; H02J 50/10; H02J 7/0044; H02J 7/00034; H02J 7/0045; H02J 7/0027; H02J 7/02; H04B 1/3888; H04B 1/3827; H04B 1/3833; H04M 1/0202; H04M 1/725

See application file for complete search history.

(56) References Cited

U.S. PATENT DOCUMENTS

| | | | |
|---|---|---|---|
| 6,027,828 A | 2/2000 | Hahn | |
| 7,199,554 B2 | 4/2007 | Kim et al. | |
| 8,634,887 B2 * | 1/2014 | Hu ..................... | H04B 1/3883 455/575.8 |
| 9,531,206 B2 | 12/2016 | Tsai et al. | |

(Continued)

*Primary Examiner* — Nhan T Le
(74) *Attorney, Agent, or Firm* — MALLOY & MALLOY, PL; Peter A. Matos

(57) ABSTRACT

A mobile telephone case that includes a housing structured to receive a mobile telephone, the housing includes a perimeter frame disposed about a perimeter of the mobile telephone to substantially cover and protect the mobile telephone, an at least partially open front face to provide access to a display screen of the mobile telephone, and a protective rear panel that is at least partially movable between an open orientation and a closed orientation when the housing is operatively disposed on the mobile telephone. The protective rear panel substantially covers and protects a rear surface of the mobile telephone when in the closed orientation, with at least a portion thereof being at least partially separable from the perimeter frame to define the open orientation that provides wireless charging access to the rear surface of the mobile telephone with the housing still disposed on the mobile telephone.

3 Claims, 2 Drawing Sheets

(56) References Cited

U.S. PATENT DOCUMENTS

| | | |
|---|---|---|
| 9,716,524 B2 | 7/2017 | Rostami |
| 9,800,084 B2 * | 10/2017 | Rybkiewicz .......... H02J 7/0044 |
| 10,264,343 B2 * | 4/2019 | Ingram ................ H04R 1/1025 |
| 10,763,688 B1 | 9/2020 | Matos |
| 10,868,898 B2 | 12/2020 | Lee et al. |
| 11,115,513 B2 | 9/2021 | Matos |
| 11,588,928 B2 | 2/2023 | Matos |
| 2014/0287800 A1 | 9/2014 | Ho |
| 2014/0287801 A1 | 9/2014 | Ho |
| 2016/0134142 A1 | 5/2016 | Murphy |
| 2016/0261133 A1 | 9/2016 | Wang |
| 2017/0170863 A1 | 6/2017 | Liu |

* cited by examiner

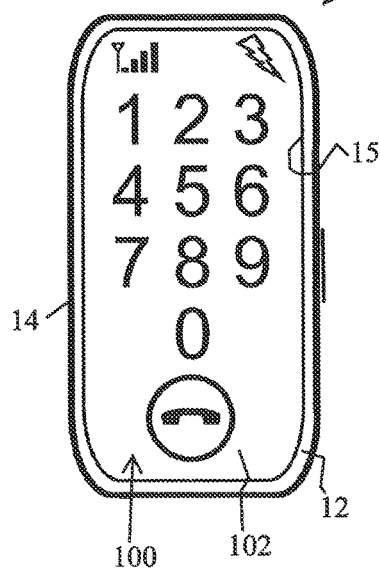
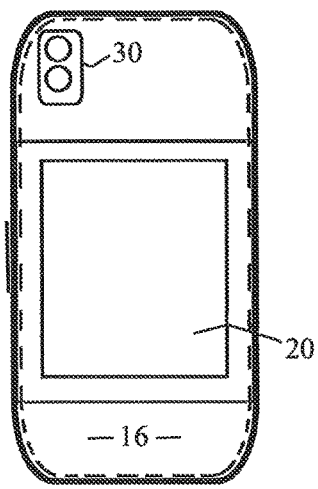
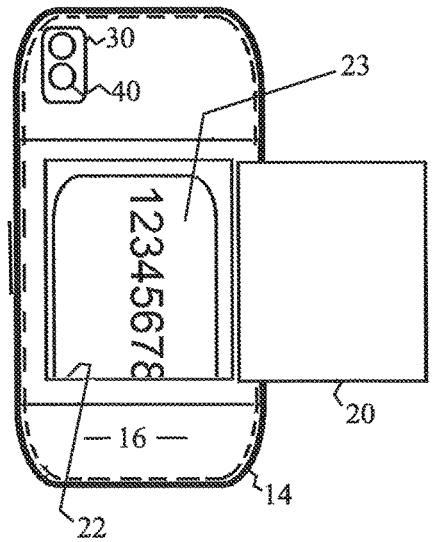
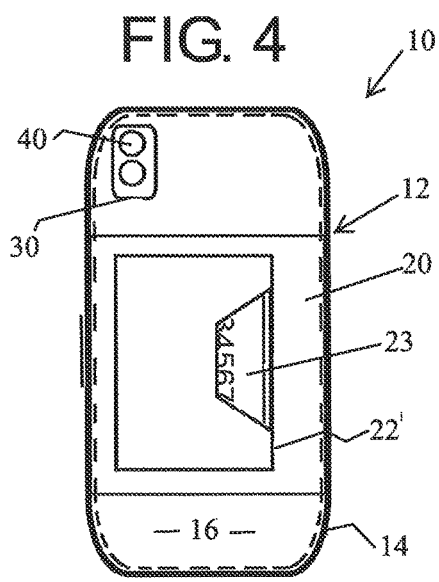

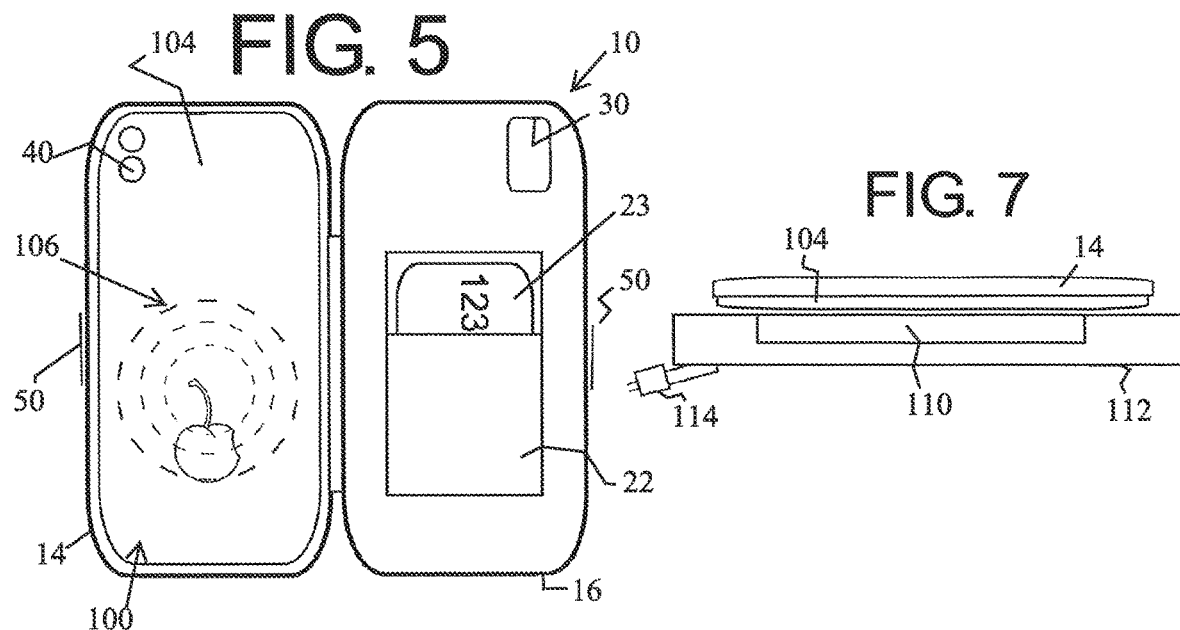
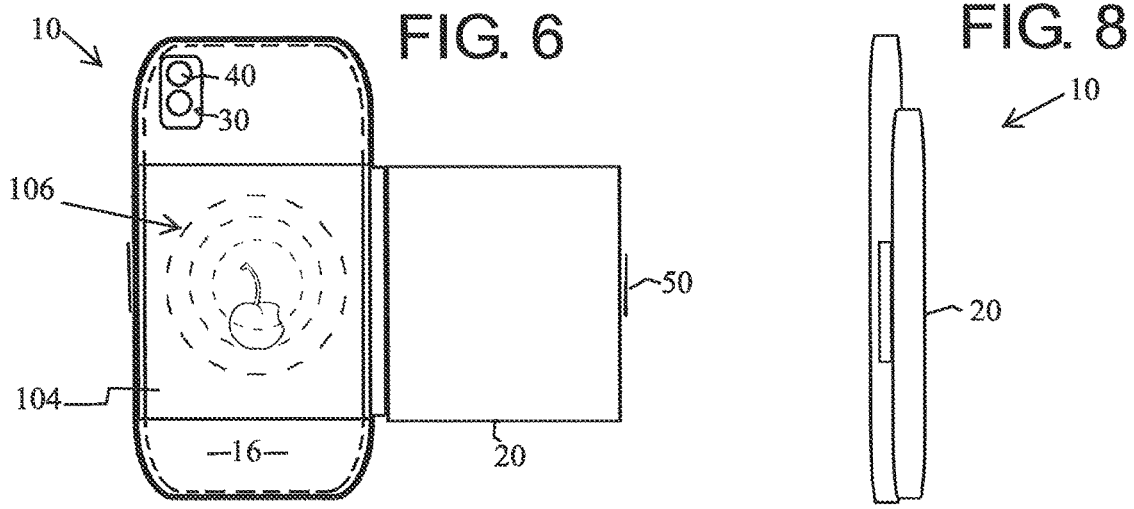
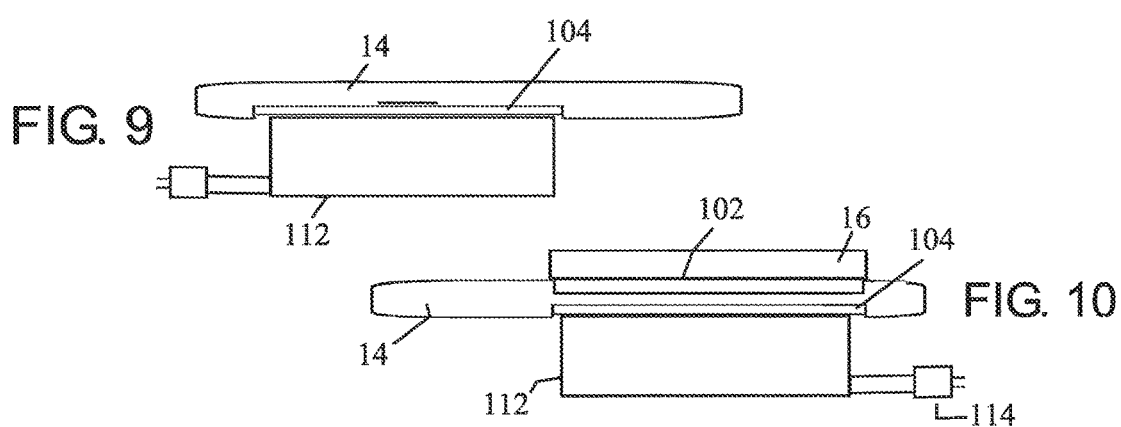

MOBILE TELEPHONE CASE FACILITATING WIRELESS CHARGING

CLAIM OF PRIORITY

The present application is a Continuation of U.S. patent application Ser. No. 17/467,687, filed on Sep. 7, 2021, which is set to mature into U.S. Pat. No. 11,588,928 on Feb. 21, 2023, which is a Continuation of U.S. patent application Ser. No. 17/009,391, filed on Sep. 1, 2020, which has issued on Sep. 7, 2021 as U.S. Pat. No. 11,115,513, which is a Continuation-In-Part patent application of previously filed U.S. patent application Ser. No. 16/272,379, filed on Feb. 11, 2019, which has issued on Sep. 1, 2020 as U.S. Pat. No. 10,763,688, which claims priority pursuant to 35 U.S.C. § 119(e) to U.S. Provisional Patent Application Ser. No. 62/628,605 filed on Feb. 9, 2018, the contents of which are incorporated herein, by reference, in their entirety.

BACKGROUND OF THE INVENTION

Field of the Invention

The present invention is directed to a protective case or housing for a mobile phone which is structured to facilitate the wireless charging of the mobile phone, while the mobile phone is still disposed within the protective case. Accordingly, the inconvenience of detachment or removal of the protective case from the mobile phone is eliminated, when the wireless charging thereof is required or desired.

Description of the Related Art

The use of mobile telephones in modern-day society has become ubiquitous. Similarly, different casings, housings, etc. are frequently utilized to at least partially enclose the mobile phone for purposes of protection. Such protection is often deemed necessary due in part to the expense of many mobile phones and the fact that such mobile phones are carried on or by an individual on a frequent, if not almost constant basis.

As is also well known, the periodic recharging of the batteries of mobile phones is a requirement in order to maintain efficient the operative and communicative capabilities of the phone. The recharging procedure for the mobile phone commonly involves the interconnection of the mobile phone to a power source utilizing a charging cable or the like. As such, the charging cable may be connected at one end directly to the mobile phone, such as by the utilization of a USB connector. The opposite end of the charging cable is connected to a conventional AC power outlet or alternatively to a computer, processor, etc.

However, more recently mobile phones have been developed which have wireless charging capabilities. Accordingly, recharging the batteries of the mobile phone is accomplished by placing the mobile phone in direct engagement or contact with a wireless recharging unit. Further by way of example, a mobile phone having wireless charging capabilities may be placed directly on a flat or other appropriately configured platform or surface. In such a position, the rear surface or other appropriate portion of the mobile phone is disposed within an appropriate and/or predetermined induction range of the transmitting coil of the wireless recharging unit. However, when the mobile phone is disposed within a conventional protective case or housing the rear surface thereof is typically covered or enclosed. Accordingly, many conventional or known protective cases for mobile phones require a removal of the case or housing from the mobile phone in order to adequately expose the rear surface and associated recharging coil of the mobile phone to the transmitting coil of the wireless recharging unit.

Therefore, there is a need in the related art of mobile phones, especially of the type having wireless recharging capabilities, for a mobile telephone case which overcomes the disadvantages and problems associated with adequate protection of the mobile phone, while concurrently facilitating the wireless recharging thereof. In more specific terms, there is a need for a protective case, housing, etc. for a mobile phone which does not require its removal or detachment, while the mobile phone is being wirelessly recharged. Further, such a preferred and proposed protective case or housing should be structured and configured to provide meaningful protection of the mobile phone, while concurrently allowing the wireless recharging thereof. Further, the structure, configuration, dimension, etc. of the protective case should be adaptable and/or capable of being structurally modified for use with different mobile phones, while facilitating their wireless recharging by any one of a plurality of different, but substantially conventional, wireless recharging units.

BRIEF DESCRIPTION OF THE DRAWINGS

For a fuller understanding of the nature of the present invention, reference should be had to the following detailed description taken in connection with the accompanying drawings in which:

FIG. 1 is a front view of a mobile phone with a protective case of the present invention disposed thereon.

FIG. 2 is a rear view of the embodiment of FIG. 1, including an access segment disposed in a closed orientation.

FIG. 3 is a rear view of the embodiment of FIG. 2 with the access segment disposed in an open orientation.

FIG. 4 is a rear view of yet another embodiment of the mobile telephone case of the present invention.

FIG. 5 is a rear view of yet another preferred embodiment of the mobile telephone case of the present invention incorporating a protective rear panel movable into an open orientation.

FIG. 6 is yet another preferred embodiment of the mobile telephone case of the present invention incorporating an access segment associated with the protective rear panel.

FIG. 7 is a side view in schematic form of a mobile phone having at least one embodiment of the mobile telephone case of the present invention, disposed thereon concurrently to being wirelessly recharged by a conventional recharging unit.

FIG. 8 is an elevation view of one longitudinal side of a preferred embodiment of the mobile telephone case of the present invention mounted on a mobile phone.

FIG. 9 is a side view in schematic form of a mobile phone having the embodiment of the mobile telephone case, as represented in FIG. 6 disposed thereon and concurrently being wirelessly recharged by a conventional recharging unit.

FIG. 10 is a side view in schematic form of a mobile phone having one additional embodiment of the mobile telephone case of the present invention disposed thereon and concurrently being wirelessly recharged by a conventional wireless recharging unit.

Like reference numerals refer to like parts throughout the several views of the drawings.

DETAILED DESCRIPTION OF THE PREFERRED EMBODIMENT

As represented in the accompanying Figures, the present invention is directed to a protective mobile telephone case generally indicated as 10 mounted on a mobile phone, generally indicated as 100. It is further emphasized herein that while the mobile telephone case 10 is capable of being used with a variety of different mobile telephones, the mobile telephone 100 is structured to include wireless recharging capabilities. Therefore, the various operative and structural features of the mobile telephone case 10 facilitate a wireless recharging thereof, as schematically represented in at least FIGS. 7-10, concurrently to the mobile telephone case 10 being maintained in its protective orientation on the mobile telephone 100.

Accordingly, the mobile telephone case 10 comprises a housing generally indicated as 12 including a perimeter frame 14 and a rear protective panel 16. The perimeter frame 14 is disposed in surrounding, enclosing relation to the exterior periphery/perimeter of the mobile phone 100 on a substantially continuous basis, as represented throughout the Figures. Also, the perimeter frame 14 includes an open front face or surface 15. As a result of this open configuration, and with primary reference to FIG. 1, the perimeter frame 14 and the open front face 15 is dimensioned and configured to provide both physical and visual access to the front face or surface of the mobile phone 100 specifically including, but not limited to, the display screen 102. As such, the display screen 102 may be viewed and the various operative features of the mobile phone 100 may be utilized and/or actuated by touching, voice actuation, etc. as is commonly practiced.

In cooperation therewith, the rear protective panel 16 is disposed in overlying, covering relation to the rear surface or face 104 of the mobile phone 100, as represented in at least FIGS. 5 and 6. As also represented throughout the Figures, at least a portion of the protective rear panel 16 may be disposed between an open orientation, as represented in at least FIGS. 3, 5 and 6 and a closed orientation, as represented in at least FIGS. 2 and 4. Further, when in the closed orientation, the protective rear panel 16 is disposed in substantially covering and protecting relation to the rear surface 104 of the mobile phone 100.

In contrast to the closed orientation, the open orientation of the protective rear panel 16 results in at least a portion of the rear face or surface 104 of the mobile phone 100 being accessible, at least for purposes of wireless recharging. As indicated above, the mobile phone 100 is of the type which includes wireless recharging capabilities. Therefore, a wireless recharging unit and or recharging coil 106, associated with the mobile phone 100, is schematically represented in at least FIGS. 5 and 6. In typical fashion, the wireless recharging coil 106 associated with the mobile phone 100 is accessible for wireless recharging by placing the rear surface 104 within a predetermined or appropriate induction range relative to the wireless transmitter circuitry 110 of the wireless recharging transmitter unit 112, as schematically represented in at least FIG. 7. As indicated, the wireless recharging unit 112 may include a variety of conventional and/or commercially available recharging units and may be powered by a plug 114 connectable to a conventional electrical power supply/output.

Additional features of one or more preferred embodiments of the mobile telephone case 10 of the present invention include the rear protective panel 16 having an access segment generally indicated as 20, wherein the access segment 20 is capable of being selectively moved or disposed between the closed orientation of FIG. 2 and the open orientation of FIG. 3. Moreover, the disposition of the access segment 20 between the open and closed orientations is determinative of at least a portion of the rear protective panel 16 being at least partially moved or disposed between the closed and open orientations, as set forth above.

Yet additional structural features of the mobile telephone case 10, including the housing 12 is the inclusion of a storage compartment generally indicated as 22 and/or 22'. The storage compartment 22/22' is disposed, dimensioned and configured to efficiently store one or more objects such as, but not limited to, one or more credit cards 23, money, in the form of paper bills or coin and/or a variety of other appropriately configured and dimensioned objects. As represented in the different structural features of the embodiments of FIGS. 3 and 4, the storage compartment 22 may be located on or at least partially within the rear protective panel 16. Further, the storage compartment 22 may be readily accessible by disposing the access segment 20 in the open orientation, as represented in FIG. 3. In contrast, the storage compartment 22' may be mounted on the access segment 20 and/or on the rear protective panel 16, but be readily accessible for insertion or removal of the contents 23, while the access segment 20 and or rear protective panel 16 remains in the closed orientation, as in FIG. 4.

With primary reference to FIG. 5 one embodiment of the mobile telephone housing 10 includes the entire rear protective panel 16 being movable into an open orientation, from a closed orientation, thereby rendering substantially the entire rear surface or face 104 of the mobile phone 100 visually and physically accessible. As such, the recharging section of the mobile telephone 100 will be clearly exposed and accessible for wireless charging, as represented schematically in FIG. 7. In at least one embodiment, the rear protective panel 16 is pivotally connected by a hinge or appropriate connecting structure 28. Therefore, the rear protective panel 16 is selectively movable, at least partially separable and otherwise disposable between the open and closed orientations by movement of the rear protective panel 16 relative to the remainder of the perimeter frame 14, by virtue of the hinge or other appropriate connecting structure 28.

Further, the hinge or movable connecting structure 28 may be configured to facilitate disposition or movable separation of the rear protective panel 16 into the open orientation, as represented in FIG. 5. Moreover, the hinge or connecting structure 28 may be further structured to allow and/or facilitate disposition of the rear protective panel 16 in complete overlapping relation to the front or open face 15 of the perimeter frame 14 as represented in FIG. 10. Such a "wraparound" orientation of the protective panel 16 in the open orientation, also provides a clear visual and physical access to the entirety of the rear surface 104 of the mobile phone 100.

With primary reference to FIG. 6, the embodiment of the mobile telephone case 10 is structured to include the access segment 20. As described with reference to the embodiment of FIGS. 2 and 3, the access segment 20 is selectively movable between an open orientation and a closed orientation, which in turn defines the open and closed orientation of the rear protective panel 16. Therefore, when the access segment 20 is in the open orientation, as represented in FIG. 6, the recharging section or transmitter coil 106 of the mobile telephone 100 is physically exposed for disposition on or in direct engagement, whether by direct or by close proximate contact, with the wireless recharging unit 112. Of course, it is understood that the inclusion of a thin protective layer over the back of the telephone in a manner that still allows it to achieve direct proximity and unimpeded charging engagement with the wireless charger is considered an equivalent and may also be provided. In the recharging position, schematically represented in FIG. 9, the transmitter coil or section 106 of the mobile phone 100 is disposed within the inductive range of the circuitry 110 of the wireless recharging unit 112, as schematically represented in FIG. 7.

Yet additional structural features which may be included in the various preferred embodiments of the mobile telephone case 10 is appropriate apertures or openings 30 for disposition in operative relation to the camera lens, lighting facilities, etc. generally indicated as 40.

Also, one or more closure structures may be mounted on the housing 12 and/or perimeter casing 14, as at 50. The latch structures 50 may be used to maintain the access segment 20 and/or the rear protective panel 16 in the closed orientation, as should be apparent. Further, the closure structure 50 may be in the form of a frictional snap closure; a magnetic contact closure; a latch closure; etc. In each of these possible structural embodiments, the latch closure 50 is structured to removably maintain the panel 16 and or the access segment 20 in the closed orientation and may be activated to release the rear protective panel 16 and or access segment 20 by an appropriately structured exterior actuator.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A mobile telephone case comprising:

a housing structured to receive a mobile telephone;

said housing including a perimeter frame disposed about a perimeter of the mobile telephone and structured to substantially cover and protect the mobile telephone;

said housing further including an at least partially open front face structured to provide access to a display screen of the mobile telephone;

said housing further comprising a protective rear panel, said protective rear panel including at least a storage compartment;

at least a portion of said storage compartment being movable between an open orientation and a closed orientation, concurrent to said housing being operatively disposed on the mobile telephone;

said storage compartment included with said protective rear panel structured to substantially cover and protect a rear surface of the mobile telephone when in said closed orientation; and at least said portion of said storage compartment that is movable into said open orientation being at least partially separable from a remainder of said rear panel to define said open orientation that provides directly proximate and unimpeded wireless charging access to the rear surface of the mobile telephone through said remainder of said protective rear panel.

2. The mobile telephone case as recited in claim 1 wherein said storage compartment is at least partially integral with said remainder of said protective rear panel.

3. The mobile telephone case as recited in claim 1 wherein said storage compartment is separable from said remainder of said protective rear panel.

* * * * *